Patented Mar. 24, 1925.

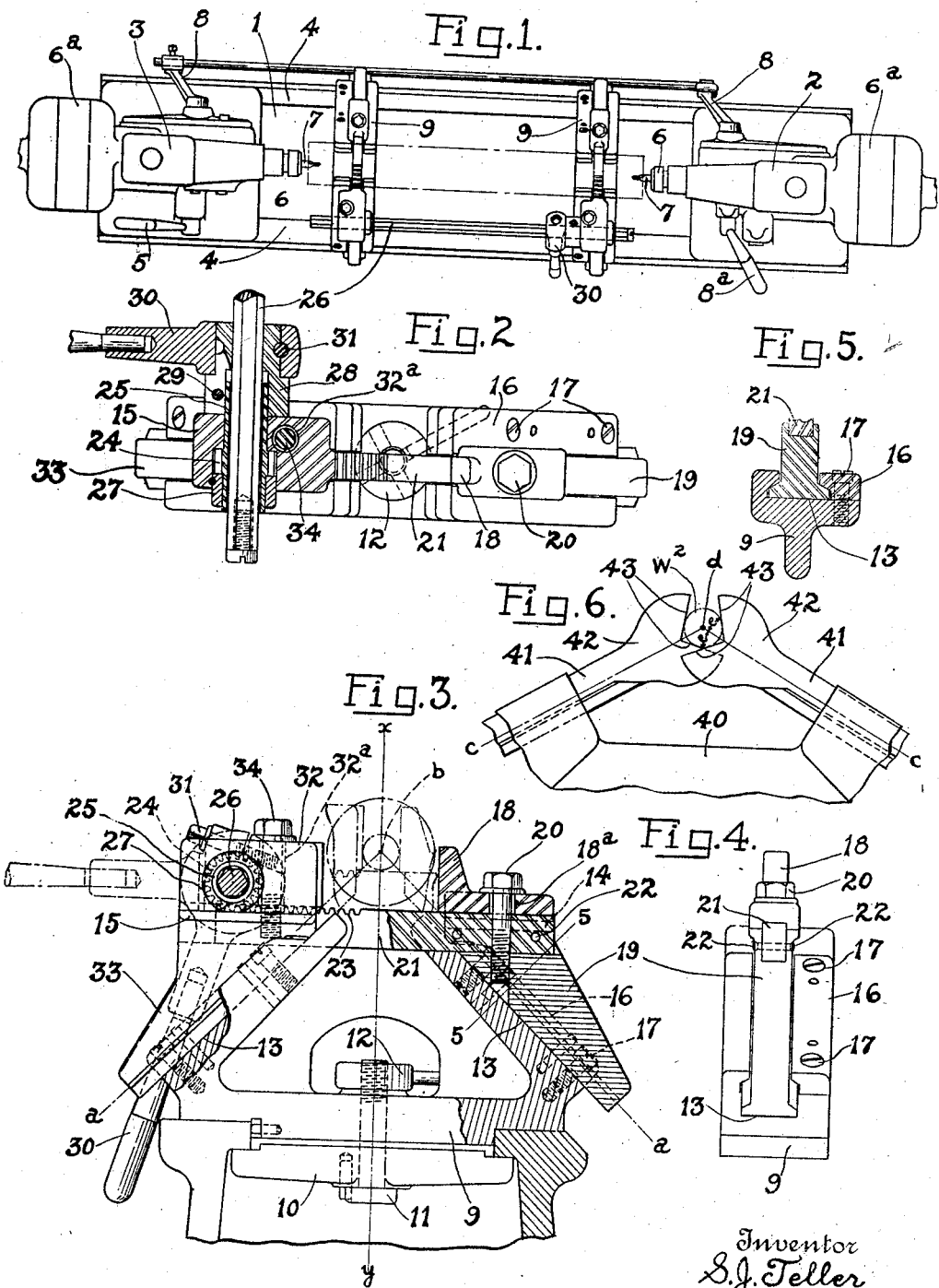

1,530,795

UNITED STATES PATENT OFFICE.

SPENCER JAY TELLER, OF HARTFORD, CONNECTICUT, ASSIGNOR TO PRATT & WHITNEY COMPANY, OF NEW YORK, N. Y., A CORPORATION OF NEW JERSEY.

WORKHOLDER.

Application filed October 8, 1921. Serial No. 506,441.

*To all whom it may concern:*

Be it known that I, SPENCER JAY TELLER, a citizen of the United States, and resident of Hartford, in the county of Hartford and State of Connecticut, have invented certain new and useful Improvements in Workholders, of which the following is a specification.

This invention relates to work supports and particularly to a vise for centering and holding a piece of work to be operated upon by a tool. It is the primary object of the invention to provide an improved work centering and holding vise for the purpose stated wherein the work may be readily and easily inserted and wherein the vise is adapted to readily and automatically center and secure work pieces of varying sizes.

It is an object of the invention to provide a work centering and holding vise of the above type which is open at the top whereby work pieces may be dropped therein from above, the closing of the vise thereafter being adapted to automatically center the work on a fixed axis and secure the same in position for the tooling operation, the work piece always being centered on the same fixed axis whatever be the size of such piece.

A further object of the invention is to provide a vise particularly adapted for use in a center drilling machine, such vise comprising a pair of work engaging jaws mounted to slide in relatively angular guideways, one of such jaws being provided with work supporting means and the guideways being so arranged that during the operative movement of the jaws, the work is engaged at three equi-distant points by the jaws and work support which in the centering operation move simultaneously and equally toward the said fixed axis in a manner to always automatically center and hold work pieces of varying diameters with their central axes in alignment with the drilling tools whereby the same may be accurately drilled upon their end faces.

With the above and other objects in view, my invention consists in the features of construction and operation set forth in the following specification and illustrated in the accompanying drawing. In such drawing annexed hereto and forming a part of this specification, I have shown my invention as applied to a center drilling machine but it will be understood that the invention can be otherwise embodied and that the drawing is not to be construed as defining or limiting the scope of the invention, the claims appended to this specification being relied upon for that purpose.

Referring to the figures of the drawing:

Figure 1 is a plan view of a center drilling machine having my invention applied thereto.

Fig. 2 is an enlarged plan view of one of the work centering and clamping vises partially in section.

Fig. 3 is an end elevation thereof partially in section.

Fig. 4 is a rear side elevation of the vise.

Fig. 5 is a detail cross section on line 5—5 of Fig. 3.

Fig. 6 is a diagrammatic end elevation of a modified form of the invention.

In center drilling and other machines wherein the work must be accurately centered and then held secured relative to a tool or tools, it is quite essential that the work centering and securing means should be such that work pieces of varying sizes may be readily inserted thereinto and accurately centered and secured. The present invention provides such a mechanism including a pair of work engaging jaws open at the top for unobstructedly receiving a piece of work. Means are further provided in connection with the jaws for automatically centering and securing work pieces in the same position relative to the tool even though such work pieces vary widely in size. The specific mechanism shown in the drawing and illustrative of my invention will now be described.

In Fig. 1 of the drawing, my invention is illustrated as applied to a center drilling machine wherein 1 is the bed of the machine on which are mounted drill supporting heads 2 and 3. The head 3 is adapted to be adjusted along the ways 4 of the bed and to be clamped in adjusted position by means of a clamping handle 5. Longitudinally slidably mounted within each head is a drill spindle 6, each supporting a drill 7 and adapted to be rotated by a motor 6ª. Means comprising a pair of connected cranks 8 operated by a handle 8ª is provided for feeding the spindles longitudinally. The work centering and securing mechanism comprising a pair of vises 9 is adjustably mounted on the ways 4 of the bed, clamping means comprising a clamping plate 10, bolt 11, and nut 12 being provided for securing the vises in any position of adjustment on the ways.

Referring more particularly to Figs. 2 to 5, it will be seen that the base of each vise is provided with two guide ways 13 arranged at an angle to each other, such guideways preferably being arranged at right angles to each other as shown in Fig. 3. Work centering and holding jaws 14 and 15 are slidably mounted in the guide ways. A shoe 16 secured by screws 17 is provided on each guideway whereby the jaws may be properly fitted in the guideways.

The jaw 14 comprises the work engaging jaw proper 18 secured to a slide 19 by means of a clamping bolt 20. A bar 21 which serves as a work support is secured to the jaw 14 between the jaw proper 18 and slide 19 by means of pins 22 and said clamping bolt 20. This bar extends from jaw 14 to within the jaw 15 wherein rack teeth 23 in the bar are engaged by a pinion 24 mounted in jaw 15. This pinion is preferably extended to form a sleeve 25. The longitudinal opening through the sleeve 25 is cylindrical in form and the hexagonal operating shaft 26 extends loosely therethrough. The pinion is held in position in the jaw 15 by means of a bushing 27. A bushing 28 is adjustably secured to the opposite end of the pinion sleeve 25 by means of a clamping bolt 29. This bushing operatively engages the operating shaft 26 which as before stated is preferably of hexagonal form in cross section. A handle 30 is adjustably secured to the bushing 28 by means of a clamping bolt 31 whereby to rotate the shaft. As shown in Fig. 1, this shaft extends to the other vise wherein it operatively engages a like pinion for operating the jaws of such vise.

Frequently it may be desired to operate on work wherein the portions thereof engaged by the two vises 9 are of different diameters. In such case, it is essential that the jaws of one vise be adjusted to a relatively closer position than the jaws of the other vise. The bushing 28 in connection with the cooperating mechanism therewith is adapted to perform this function. By loosening the clamping screw 29, the bushing may be rotatably adjusted on the sleeve 25 and pinion 24. Such adjustment rotates the shaft 26 relative to the pinion 24 whereby the jaws of one vise are relatively adjusted independently of the jaws of the other vise. It should further be noted that the handle is rotatably adjustable on the bushing 28 to the most convenient operating position, clamping bolt 31 being adapted to secure the handle in such position.

The jaw 15, like jaw 14, comprises the work engaging jaw proper 32 secured to a slide 33 by means of a clamping bolt 34. It will be noted that the holes 18ª and 32ª through the jaws 18 and 32 are slightly larger than the clamping bolts 20 and 34. Such looseness permits of a slight adjustment of the jaws to compensate for wear or any inaccuracy therein. This construction also permits of the initial adjustment of the jaws to their proper positions relative to the bar 21 and to each other.

As shown in Fig. 3, the guideways 13 are arranged at right angles to each other and each guideway is inclined 45° to the vertical line $x-y$. In operation, the slides move along lines $a-b$ directly toward a common axis or center $b$. It will furthermore be noted that, as illustrated, the work engaging surfaces of the jaws 18 and 32 are vertical and the work supporting surface of the bar 21 is horizontal. The line $a-b$, parallel with the line of movement of each jaw and passing through the intersection of the vertical and horizontal work engaging surfaces, bisects the angle formed by the said vertical and horizontal work engaging surfaces in each slide. The perpendicular distance between such surfaces on each slide and the point $b$, which point is in the said bisector line, are always equal. For this reason, the work piece is accurately centered on the axis $b$ whatever be the diameter of such piece.

In operation, the jaws 18 and 32 and the work supporting bar 21 always move through equal horizontal and vertical distances respectively toward the center $b$. The vise is therefore adapted to accurately center work pieces of varying sizes, as shown particularly in Fig. 3, the center of such pieces being always at the fixed and common axis $b$. In Fig. 3, the jaws 18 and 32 and the supporting bar 21 are shown in dot and dash lines as engaging a small piece of work W', the center of such work piece being at the point $b$ coincident with the center of the larger piece W.

In operation, a work piece may be dropped directly into the jaws from above. The handle 30 may then be raised to rotate the shaft 26 and close the jaws. In this operation, the work piece is engaged at three spaced points by three parts (18, 21 and 32) all equally movable towards the fixed axis $b$ whereby the piece is accurately centered and secured relative to the tool. It will be understood that in the center drilling machine shown in Fig. 1, the axes of the drills 7 are coincident with the fixed axis $b$ of the work centering vises 9.

While the mechanism shown in Figs. 1 to 5 of the drawing, as above described, illustrates the preferred form of my invention, it should be clearly understood that the same may be embodied in other forms if desired. Fig. 6 of the drawing is illustrative of another such form of the invention. In such figure, 40 indicates the base of a vise in which are mounted a pair of slides 41 arranged at an obtuse angle to each other. The slides are adapted to be simultaneously moved in their guideways lineally along lines $c$—$d$ directly toward the fixed center $d$, any convenient means being provided for so moving the slides. A work piece $W^2$ is indicated in Fig. 6 as centered on the fixed axis $d$ between the work engaging jaws 41 and 42. Each slide is provided with a work engaging jaw 42 which comprises two obliquely extending work engaging surfaces 43. It will be noted that the angle $e$ between each of these surfaces of each slide and the axial line of movement ($c$—$d$) of such slide through the intersection of the said engaging surfaces thereof are equal. By such construction the right angular distances between each said surfaces of each jaw and the fixed axis $d$ are always equal whatever be the diameter of the work. The jaws must necessarily be constructed in accordance with these details if they are to accurately center work pieces of varying diameters. It will be noted that the construction shown in Fig. 3 is in accordance with such details and that the last said angles in such jaws (corresponding to angles $e$ in Fig. 6) are each 45° angles.

It will furthermore be noted that the upper work engaging surfaces 43 of the jaws 42, while extending in a substantially vertical direction, are slightly inclined inwardly from the vertical. Such inclination is adapted to not only hold the work piece within the jaws but to also hold the same downwardly into close contact with the lower work supporting surfaces 43 of the jaws. It will be understood that one or both jaws 18 and 32 may be constructed in this manner, if desired.

What I claim is:

1. A centering and holding vise comprising the combination of two laterally movable work engaging elements each provided with a work engaging surface extending in a generally vertical direction, work supporting means extending beneath and between the laterally movable surfaces, and means for moving the said elements inwardly and the said work supporting means upwardly always simultaneously and uniformly toward a common axis.

2. A centering and holding vise comprising the combination of a base, a pair of angularly disposed guideways therein, an element slidably mounted in each guideway, work engaging means on the elements comprising three angularly disposed work engaging surfaces adapted in the work engaging operation of the elements to always move simultaneously and uniformly toward a common axis, and means for moving the elements in their guideways.

3. A centering and holding vise comprising the combination of a base, a pair of angularly disposed guideways therein converging upwardly, an element slidably mounted in each guideway, work engaging means on the elements comprising two vertically disposed work engaging surfaces and a horizontally disposed work supporting surface, the said surfaces being adapted in the work engaging operation of the elements to always move simultaneously and uniformly toward a common axis, and means for moving the elements in their guideways.

4. A centering and holding vise comprising the combination of a base, a pair of angularly disposed guideways therein converging upwardly, an element slidably mounted in each guideway, work engaging means on each element, work supporting means secured to one of the elements and extending beneath and between the first mentioned work engaging surfaces, the said surfaces and supporting means being adapted in the work engaging operation of the elements to always move simultaneously and uniformly toward a common axis, and means for moving the elements in their guideways.

5. A centering and holding vise comprising the combination of a base, a pair of angularly disposed guideways therein converging upwardly, an element slidably mounted in each guideway, work engaging means on each element, a work supporting bar secured to one of the elements and extending beneath and between the first mentioned work engaging surfaces, and means on the other element operatively connected to the bar for simultaneously moving the elements in their guideways, the said surfaces and bar being adapted in the work engaging operation of the elements to always move simultaneously and uniformly toward a common axis.

6. A centering and holding vise comprising the combination of a base, a pair of angularly disposed guideways therein, a work engaging jaw mounted to slide in each guideway, a bar secured to one jaw and extending to the other jaw, such bar serving to support a piece of work placed loosely between the jaws, rotary means on the said other jaw directly engaging the bar for sliding the jaws in the guideways.

7. A centering and holding vise comprising the combination of a base, a pair of guideways formed on the top surface thereof at an angle to each other, a slide mounted for linear movement on each guideway, work engaging means comprising an upwardly extending work engaging surface on each slide, work supporting means connected to the slides and provided with a work supporting surface extending beneath and between the said upwardly extending surfaces and at an angle thereto, the arrangement being such that the angle formed by the said relatively angular surfaces of each slide is bisected by a line passing through the apex of such angle and parallel with the line of movement of such slide in its guideway, and cooperating means for simultaneously moving the slides.

8. A centering and holding vise comprising the combination of a base, a pair of relatively right angular upwardly converging guideways therein, a work engaging jaw mounted to slide in each guideway, means on one jaw and extending between the jaws for supporting a piece of work, and means for sliding the jaws in the guideways.

9. A centering and holding vise comprising the combination of a base adapted to be mounted on a horizontal support, a pair of relatively right angular upwardly converging guideways thereon, each guideway extending 45° from the vertical, a work engaging jaw mounted to slide on each guideway, means extending horizontally from one jaw to the other and serving to support a piece of work placed loosely between the jaws, and means operatively connected to the last mentioned means for sliding the jaws in the guideways, the sliding movement of each jaw always being through equal vertical and horizontal distances.

10. A work centering and holding mechanism comprising the combination of a pair of vises, each vise comprising a base, a pair of relatively angular upwardly converging guideways thereon, a work engaging jaw mounted to slide on each guideway, means between the jaws for supporting a piece of work, and means common to both vises for sliding the jaws thereof in their guideways in a manner to move the said jaws and the said work supporting means simultaneously and with equal speed toward a common axis.

11. A work centering and holding mechanism comprising the combination of a pair of vises, each vise comprising a base, a pair of relatively angular upwardly converging guideways thereon, a work engaging jaw mounted to slide on each guideway, means between the jaws for supporting a piece of work, means common to both vises for sliding the jaws thereof in their guideways in a manner to move the said jaws and the said work supporting means simultaneously and with equal speed toward a common axis, and means for relatively adjusting the jaws of one vise independently of the other vise.

12. A work centering and holding mechanism comprising the combination of a pair of vises, each vise comprising a base, a pair of relatively right angular upwardly converging guideways thereon, a work engaging jaw mounted to slide on each guideway, a rack bar extending from one jaw to the other of each vise and serving to support a piece of work placed loosely between the jaws, a pinion engaging each rack bar, and a shaft operatively connected with the pinions for sliding the jaws in the guideways in a manner to move the said jaws and the said bar simultaneously and with equal speed toward a common axis.

In testimony whereof I hereto affix my signature.

S. JAY TELLER.